United States Patent Office 3,423,188
Patented Jan. 21, 1969

3,423,188
PROCESS FOR PREPARING ALKALI METAL
ALUMINATE TETRAHYDRATE CRYSTALS
Lawrence E. Lutwitzi, Westmont, and John L. Gerlach, Bridgeview, Ill., assignors to Nalco Chemical Company, Chicago, Ill., a corporation of Delaware
No Drawing. Filed Feb. 23, 1965, Ser. No. 434,644
U.S. Cl. 23—301          7 Claims
Int. Cl. C01f 7/04

ABSTRACT OF THE DISCLOSURE

Alkali metal aluminates having four (4) moles of water bound to the aluminate crystal are prepared by forming an aqueous solution of the aluminate in water such that its concentration ranges from 40% to 70% by weight and the ratio of alkali metal, expressed as $M_2O$, to alumina, expressed as $Al_2O_3$, ranges from 1.01 to 1.4. The solution is then desiccated in the presence of a water desiccant for a sufficient time to form the tetrahydrate crystals.

---

This invention relates to a new crystalline form of alkali metal aluminates, and more particularly to alkali metal aluminates having four moles of water bound to the aluminate crystal.

Crystalline solid forms of alkali metal aluminates have been well known for many years, and these compounds have advantageously been used in many varied commercial processes such as coagulation, papermaking operations and the like. Particularly useful due to its low cost is solid crystalline sodium aluminate. Many thousands of pounds of this commercially successful product are sold annually. It is easy to handle, economical to ship, can be fed directly into a system which is to be treated, with a minimum amount of labor and equipment. Recently, however, efforts have been made to make this highly effective chemical even more efficient.

Occasionally, when extreme accuracy of addition is essential, it sometimes develops that a solid sodium aluminate cannot be fed with the proper desired exactness, even when completely free from moisture and in a discrete solid form. To obtain greater accuracy of treatment control, resort must then be had to use of liquid sodium aluminate compositions.

Also, use of a solid aluminate fed directly into the system to be treated sometimes necessarily results in a time lag before effectiveness of such aluminates can occur. This is due to the lack of immediate solubilization in the system under control. For example, a solid type of alumina fed into a coagulation zone requires a certain amount of mixing before solubilization can take place completely and effectively. Aqueous systems or partially aqueous systems and particularly those in the quiescent state, under normal operating conditions do not fully and efficiently utilize a solid aluminate product until a certain period of time has elapsed. In fact, in many instances, a solid aluminate must be solubilized prior to use, which solubilization step is time consuming and uneconomical in many industrial processes. For these reasons, it would be a benefit to the art if a solid form of sodium aluminate could be made which would dissolve more rapidly in water so as to decrease the loss of utilization time.

It, therefore, becomes an object of this invention to provide a new composition of matter comprising alkali metal aluminates in novel solid crystalline form.

Another object of this invention is to provide solid alkali metal aluminates which may be dissolved more rapidly in water.

A specific object of this invention is to provide a more water soluble solid sodium aluminated in crystal form.

Other objects will appear hereinafter.

It has now been discovered that novel crystalline alkali metal aluminates may be prepared in the tetrahydrate form. These heretofore unknown compounds may be defined by the formula $M_2Al_2O_4 \times 4H_2O$, where M represents an alkali metal. Specific alkali metals which may be employed in this invention are sodium, potassium, rubidium, cesium and the like. While any of the alkali metals may be used, it is greatly preferred to use sodium, due to the low cost and great abundance of this metal.

The compounds of this invention may be prepared by a simple crystallization process described below.

The first step in preparing the alkali metal aluminates of the invention is to prepare a concentrated aqueous solution of an alkali metal aluminate in water. It has been found necessary to use solutions having a concentration of from 40% to 70% by weight of metal aluminate, with the balance being water. It is preferred that the concentration be from 50% to 60% and most preferably, about 55% alkali metal aluminate in water. It has also been found that the particular alkali metal aluminates useful as starting materials for preparation of the novel claimed compounds should have a ratio of alkali metal, expressed as $M_2O$, to alumina, as $Al_2O_3$, ranging from 1.01 to 1.4. The preferred range of these constituents is from 1.05 to 1.25.

Once the solution has been prepared, it is a simple matter to store the liquid aluminate for from several days to several weeks or longer, during which time tetrahydrate crystals will form. It has been found that the rate of crystallization may be increased by a technique known as "seeding" whereby a minor amount of a tetrahydrate crystal is added to the solution to initiate crystalline formation.

It is a preferred embodiment of the preparation to use a desiccator device or water absorbent to aid in the removal of water. Any of the well known desiccants may be employed with success. Examples of various useful desiccants are calcium chloride, barium perchlorate, sodium hydroxide sticks, magnesium perchlorate, silica gel, potassium hydroxide sticks, alumina, calcium sulfate, calcium oxide, barium oxide, concentrated sulfuric acid, zinc chloride, phosphorus pentoxide, and the like.

A further preferred embodiment of the process for preparing the novel compounds of this invention is to include a carbon dioxide desiccant. Various desiccants which may be employed to remove carbon dioxide are sodium hydroxide, potassium hydroxide, barium hydroxide, soda lime, etc.

It is also desirable to increase the rate of crystallization by applying a vacuum to the aluminate solution during crystal formation. It has been found that the optimum rate of crystallization occurs at approximately room temperature. Water removal at this temperature can be increased by the use of an evacuated atmosphere, thus accelerating crystal formation and growth.

The resulting crystalline aluminates prepared by the above described process exhibit a large smooth surfaced crystal having a hemispherical shape. After drying at less than 50° C. to remove excess water, the compounds may be crushed or ground into finely divided needle-like crystals.

A sample of sodium aluminate tetrahydrate was prepared by the above outlined process. The following analysis are presented to verify the novel chemical structure.

Elemental chemical analysis of a number of samples of sodium aluminate tetrahydrate, hereinafter called tetrahydrate, showed from 29% to 31% by weight water, which is in close agreement with the theoretical value of 30.5% water. By comparison, sodium aluminate trihydrate contains only about 21% water by weight.

Other samples of the tetrahydrate were analyzed using a technique known as differential thermal analysis. In this method, a sample is carefully heated at a precisely controlled rate. A detector monitors the changes in heat content of the sample. Sudden large changes in the heat content of the sample indicate a change in crystal structure and release of water. This temperature at which these crystal changes occur are characteristic of the particular compound being tested. The sample of tetrahydrate evidenced three peaks which were indicative of a change in crystal structure and water release. These peaks occurred at approximately 105° C., 140° C., and 220° C. In contrast, when analyzed under identical conditions, sodium aluminate trihydrate showed only one at about 190° C. The additional peaks found in the tetrahydrate sample clearly indicates that the additional water is bonded to the crystal.

A corollary experiment was performed to verify the above just-discussed conclusion. A sample of tetrahydrate was heated at 105° C. for several hours. The product decomposed slightly and gave off an amount of water. The resulting product was found by chemical analysis and by other means to be sodium aluminate trihydrate.

Still another method which may be used to verify the novel crystalline structure of this invention is via X-ray diffraction. Prior art types of solid alkali metal aluminate have a characteristic clear reproducible pattern under X-ray diffraction. These are described in A.S.T.M. Special Technical Publication 48N. It should be noted that there is no listed diffraction pattern for any alkali metal aluminate tetrahydrate.

When a sample of sodium aluminate tetrahydrate was analyzed by X-ray diffraction, a reproducible pattern was found which characterized and identified the tetrahydrate structure. The following table, presented below, shows a comparison between a prior art trihydrate and the novel tetrahydrate crystalline form of sodium aluminate.

TABLE I.—COMPARISON OF SODIUM ALUMINATE CRYSTALS BY X-RAY DIFFRACTION

| Sodium aluminate tetrahydrate | | Sodium aluminate trihydrate | |
| --- | --- | --- | --- |
| d A. | Intensity | d A. | Intensity |
| 4.11 | 10 | 5.30 | 62 |
| 3.65 | 8 | 4.32 | 69 |
| 3.12 | 100 | 3.90 | 3 |
| 3.04 | 6 | 3.70 | 6 |
| 2.93 | 15 | 3.52 | 41 |
| 2.79 | 5 | 3.32 | 33 |
| 2.63 | 23 | 3.05 | 53 |
| 2.59 | 9 | 2.93 | 23 |
| 2.41 | 5 | 2.82 | 72 |
| 2.20 | 26 | 2.66 | 40 |
| 2.04 | 12 | 2.63 | 41 |
| 2.02 | 11 | 2.55 | 92 |
| 2.00 | 10 | 2.50 | 86 |
| 1.96 | 4 | 2.30 | 100 |
| 1.69 | 12 | 2.15 | 18 |
| 1.65 | 5 | 2.07 | 17 |
| 1.62 | 4 | 1.95 | 11 |
| 1.52 | 8 | 1.91 | 8 |
| 1.45 | 4 | 1.84 | 8 |
| 1.35 | 19 | 1.80 | 12 |
| | | 1.77 | 5 |
| | | 1.72 | 38 |
| | | 1.66 | 31 |
| | | 1.60 | 36 |
| | | 1.49 | 42 |
| | | 1.44 | 36 |
| | | 1.35 | 31 |

The values for $d$ A., in Table I above, represent the distance in angstroms between the crystal planes. The intensities are shown as relative intensities, with the highest intensity for each crystal being assigned a value of 100, and the remaining intensities being assigned in relative proportion. As can be seen from the comparison of the novel tetrahydrate crystals with prior art trihydrate crystals, a marked difference in both $d$ A. and the order of their intensities is readily apparent.

A corollary experiment was run to further show the differences between the two crystals. A sample of sodium aluminate tetrahydrate was heated at 180° C. for a short period of time, for the purpose of driving off one mole of water to form the trihydrate. Analysis by X-ray diffraction yielded a pattern which was almost identical with that of sodium aluminate tryhydrate as shown in Table I.

It has further been discovered that the solubility characteristics of alkali metal tetrahydrates are superior to prior art type trihydrate aluminates. For example, solubility tests were performed to determine the time required to form a 1% solution by weight of sodium aluminate in water. Conventional sodium aluminate trihydrate was added to sufficient water to make up a 1% aqueous solution, based solely on sodium aluminate content. It was necessary to stir the mixture for approximately sixty seconds before complete solubility was achieved. An equal amount of sodium aluminate tetrahydrate, based solely on the weight of the sodium aluminate, was added to a like amount of water, and complete solubilization of the solid compound occurred in about 30 seconds. The results of these two tests clearly show that the tetrahydrate form of aluminate is superior in rate of solubilization to the prior art trihydrate form.

Having thus described our invention, what we desire to secure by Letters Patent is:

1. A process for the preparation of alkali metal aluminate tetrahydrate crystals having the formula $$M_2Al_2O_4 \times 4H_2O$$

where M represents an alkali metal, said process comprising the following steps:
  (A) forming an aqueous solution of alkali metal aluminate in water such that the concentration of alkali metal aluminate ranges from 40% to 70% by weight of the solution, said alkali metal aluminate having a ratio of alkali metal, expressed as $M_2O$, to alumina, expressed as $Al_2O_3$, ranging from 1.01 to 1.4;
  (B) desiccating said aqueous solution in the presence of a water desiccant for sufficient time to form said tetrahydrate crystals; and
  (C) removing said crystals from said solution.

2. The process of claim 1 where the alkali metal is potassium.

3. The process of claim 1 where the alkali metal is sodium.

4. The process of claim 1 where said crystals are dried at less than 50° C.

5. A process for the preparation of alkali metal aluminate tetrahydrate crystals having the formula $$M_2Al_2O_4 \times 4H_2O$$

where M represents an alkali metal, said process comprising the following steps:
  (A) forming an aqueous solution of alkali metal aluminate in water such that the concentration of alkali metal aluminate ranges from 50% to 60% by weight of the solution, said alkali metal aluminate having a ratio of alkali metal, expressed as $M_2O$, to alumina expressed as $Al_2O_3$, rainging from 1.05 to 1.25;
  (B) seeding said aqueous solution by adding a minor amount of alkali metal aluminate tetrahydrate crystals;
  (C) desiccating said aqueous solution in the presence of a water desiccant and a carbon dioxide desiccant for sufficient time to form said tetrahydrate crystals, said desiccating being carried out under vacuum; and (D) removing said crystals from said solution and drying said crystals at a temperature of less than 50° C.

6. The process of claim 5 where said alkali metal is potassium.

7. The process of claim 5 where the alkali metal is sodium.

References Cited

UNITED STATES PATENTS 1,931,374 10/1933 Clark et al. _____ 23—52
2,018,607 10/1935 Cushing et al. _____ 23—52

OSCAR R. VERTIZ, *Primary Examiner.*

HERBERT T. CARTER, *Assistant Examiner.*

U.S. Cl. X.R.

23—52, 302, 305